United States Patent [19]
Curry

[11] Patent Number: 6,134,902
[45] Date of Patent: Oct. 24, 2000

[54] BATTERY OPERATED AIR CONDITIONER

[76] Inventor: Carline Curry, 606 Bowman St., Mansfield, Ohio 44903

[21] Appl. No.: 09/231,381

[22] Filed: Jan. 14, 1999

[51] Int. Cl.[7] .................................................. F25B 27/00
[52] U.S. Cl. .......................... 62/236; 62/235.1; 62/457.9
[58] Field of Search .................... 62/236, 235.1, 62/457.9

[56] References Cited

U.S. PATENT DOCUMENTS

| 4,577,471 | 3/1986 | Meckler | 62/235.1 X |
| 5,200,644 | 4/1993 | Kobayashi et al. | 62/236 X |
| 5,878,584 | 3/1999 | Sasaki et al. | 62/236 X |

FOREIGN PATENT DOCUMENTS

| 358150749 | 9/1983 | Japan. |
| 359071943 | 4/1984 | Japan. |
| 362155459 | 7/1987 | Japan. |
| 401127846 | 5/1989 | Japan. |
| 401179854 | 7/1989 | Japan. |
| 406042781 | 2/1994 | Japan. |
| 408291935 | 4/1995 | Japan. |
| 407176881 | 7/1995 | Japan. |

*Primary Examiner*—William Doerrler
*Assistant Examiner*—Chen-Wen Jiang

[57] ABSTRACT

A new battery opperated air conditioner for providing an air conditioner which may be powered solely upon battery and or battery and solar power in conjunction with alternating current power. The inventive device includes a conventional air conditioner, a rechargeable battery secured within and electrically connected to the conventional air conditioner, and a solar panel pivotally attached to a rear portion of the conventional air conditioner and electrically connected to the rechargeable battery.

11 Claims, 4 Drawing Sheets

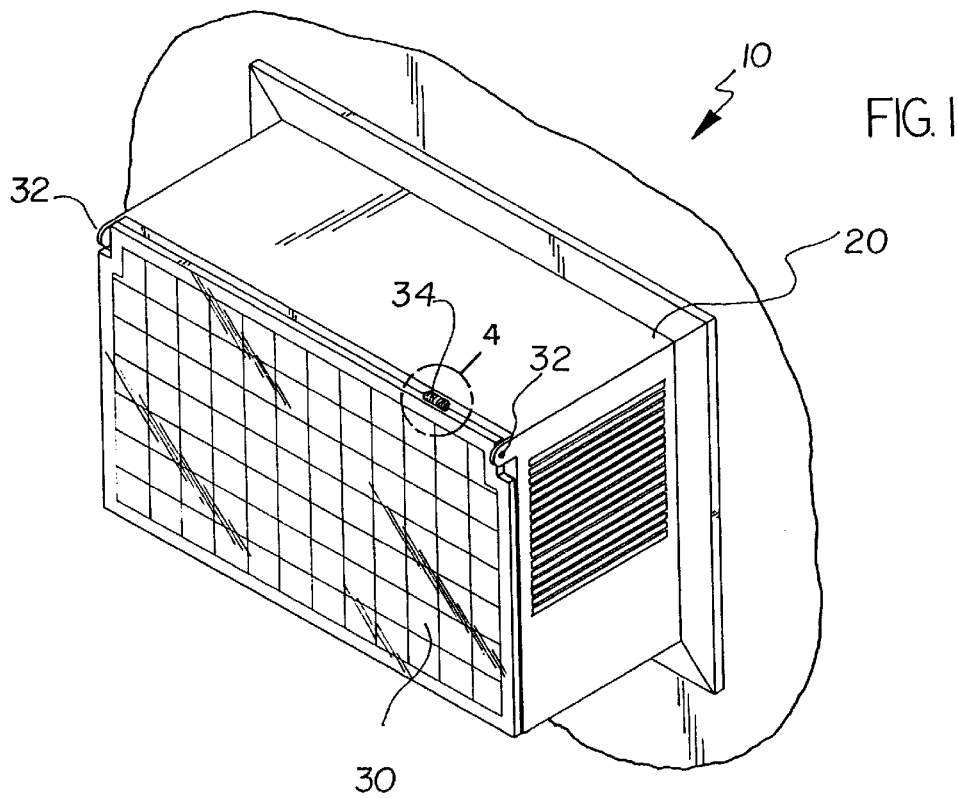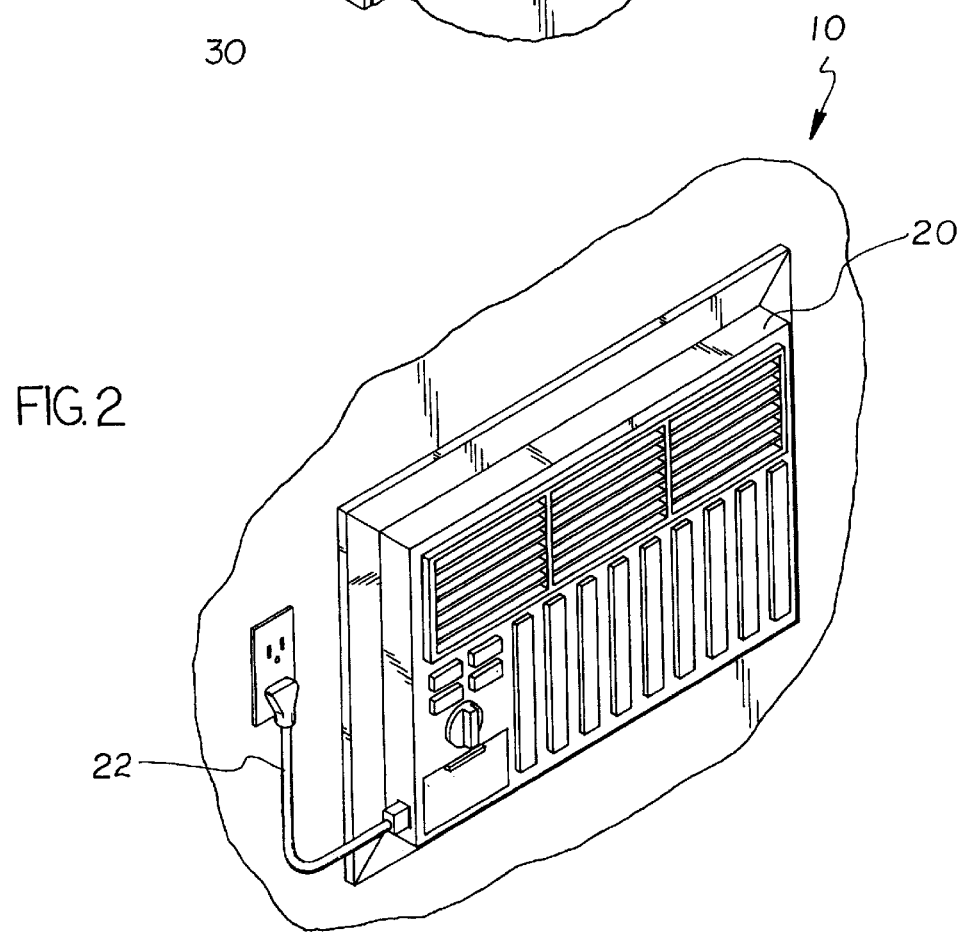

BATTERY OPERATED AIR CONDITIONER

BACKGROUND OF THE INVENTION

1. Field of the Invention

The present invention relates to air conditioner devices and more particularly pertains to a new battery operated air conditioner for providing an air conditioner which may be powered solely upon battery and or battery and solar power and or with alternating current power.

2. Description of the Prior Art

The use of air conditioner devices is known in the prior art. More specifically, air conditioner devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art air conditioner devices include U.S. Pat. Nos. 5,200,644; 4,841,742; 5,379,596; 5,197,301; U.S. Design Patent No. 342,780; and U.S. Pat. No. 3,943,726.

While these devices fulfill their respective, particular objectives and requirements, the aforementioned patents do not disclose a new battery operated air conditioner. The inventive device includes a conventional air conditioner, a rechargeable battery secured within and electrically connected to the conventional air conditioner, and a solar panel pivotally attached to a rear portion of the conventional air conditioner and electrically connected to the rechargeable battery.

In these respects, the battery operated air conditioner according to the present invention substantially departs from the conventional concepts and designs of the prior art, and in so doing provides an apparatus primarily developed for the purpose of providing an air conditioner which may be powered solely upon battery and or battery and solar power.

SUMMARY OF THE INVENTION

In view of the foregoing disadvantages inherent in the known types of air conditioner devices now present in the prior art, the present invention provides a new battery operated air conditioner construction wherein the same can be utilized for providing an air conditioner which may be powered solely upon battery and or battery and solar power.

The general purpose of the present invention, which will be described subsequently in greater detail, is to provide a new battery operated air conditioner apparatus and method which has many of the advantages of the air conditioner devices mentioned heretofore and many novel features that result in a new battery operated air conditioner which is not anticipated, rendered obvious, suggested, or even implied by any of the prior art air conditioner devices, either alone or in any combination thereof.

To attain this, the present invention generally comprises a conventional air conditioner, a rechargeable battery secured within and electrically connected to the conventional air conditioner, and a solar panel pivotally attached to a rear portion of the conventional air conditioner and electrically connected to the rechargeable battery.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new battery operated air conditioner apparatus and method which has many of the advantages of the air conditioner devices mentioned heretofore and many novel features that result in a new battery operated air conditioner which is not anticipated, rendered obvious, suggested, or even implied by any of the prior art air conditioner devices, either alone or in any combination thereof.

It is another object of the present invention to provide a new battery operated air conditioner which may be easily and efficiently manufactured and marketed.

It is a further object of the present invention to provide a new battery operated air conditioner which is of a durable and reliable construction.

An even further object of the present invention is to provide a new battery operated air conditioner which is susceptible of a low cost of manufacture with regard to both materials and labor, and which accordingly is then susceptible of low prices of sale to the consuming public, thereby making such battery operated air conditioner economically available to the buying public.

Still yet another object of the present invention is to provide a new battery operated air conditioner which provides in the apparatuses and methods of the prior art some of the advantages thereof, while simultaneously overcoming some of the disadvantages normally associated therewith.

Still another object of the present invention is to provide a new battery operated air conditioner for providing an air conditioner which may be powered solely upon battery and or battery and solar power in conjunction with alternating current power.

Yet another object of the present invention is to provide a new battery operated air conditioner which includes a conventional air conditioner, a rechargeable battery secured within and electrically connected to the conventional air conditioner, and a solar panel pivotally attached to a rear portion of the conventional air conditioner and electrically connected to the rechargeable battery.

Still yet another object of the present invention is to provide a new battery operated air conditioner that provides mobile power to a conventional air conditioner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a rear upper perspective view of a new battery operated air conditioner according to the present invention.

FIG. 2 is a front upper perspective view of the present invention.

DESCRIPTION OF THE PREFERRED EMBODIMENT

Figure 3:
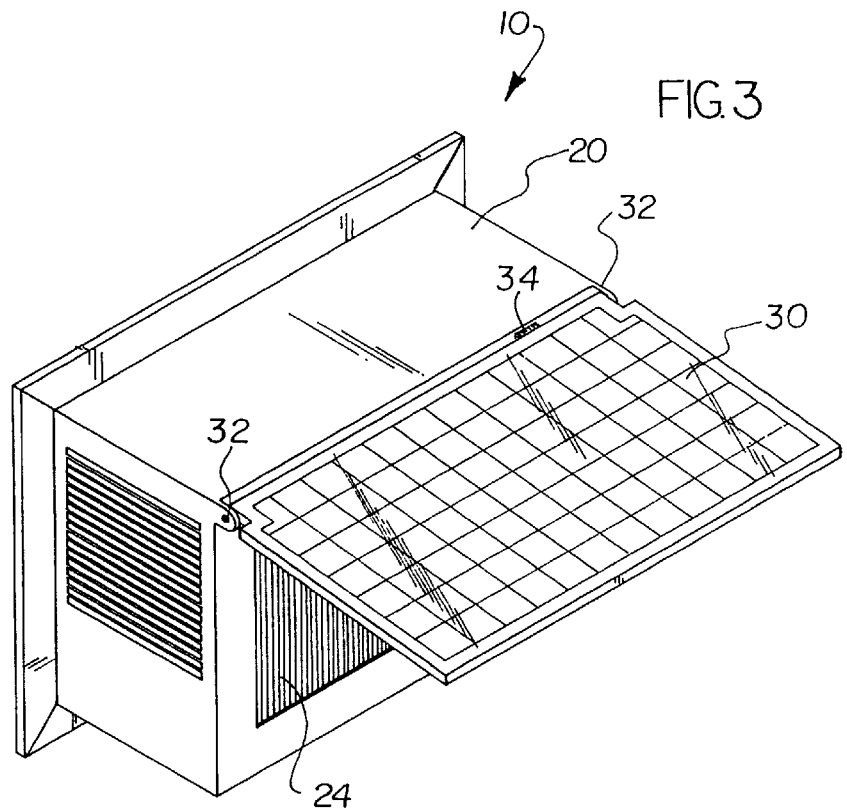
FIG. 3 is a rear upper perspective view of the present invention.
Figure 4:
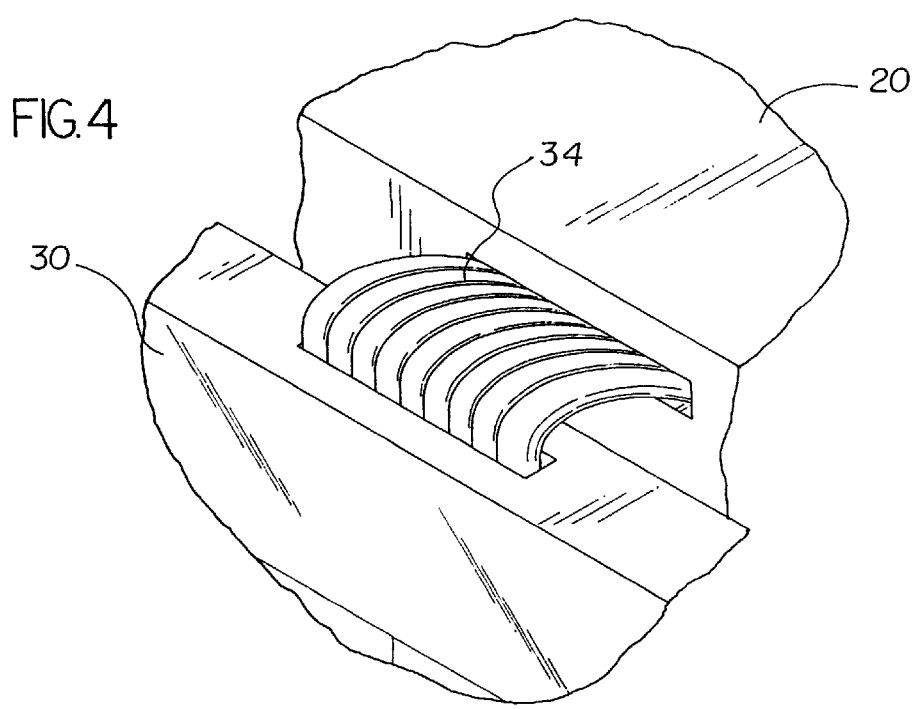
FIG. 4 is a magnified view from FIG. 1.

With reference now to the drawings, and in particular to FIGS. 1 through 7 thereof, a new battery operated air conditioner embodying the principles and concepts of the present invention and generally designated by the reference numeral 10 will be described.

Figure 5:
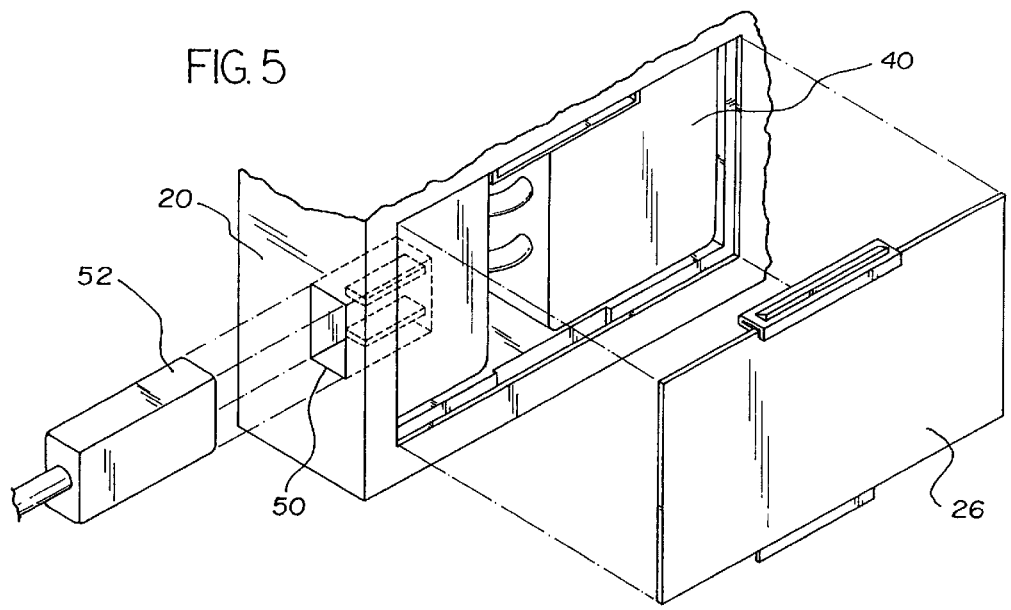
FIG. 5 is a magnified exploded view of the rechargeable battery.
Figure 6:
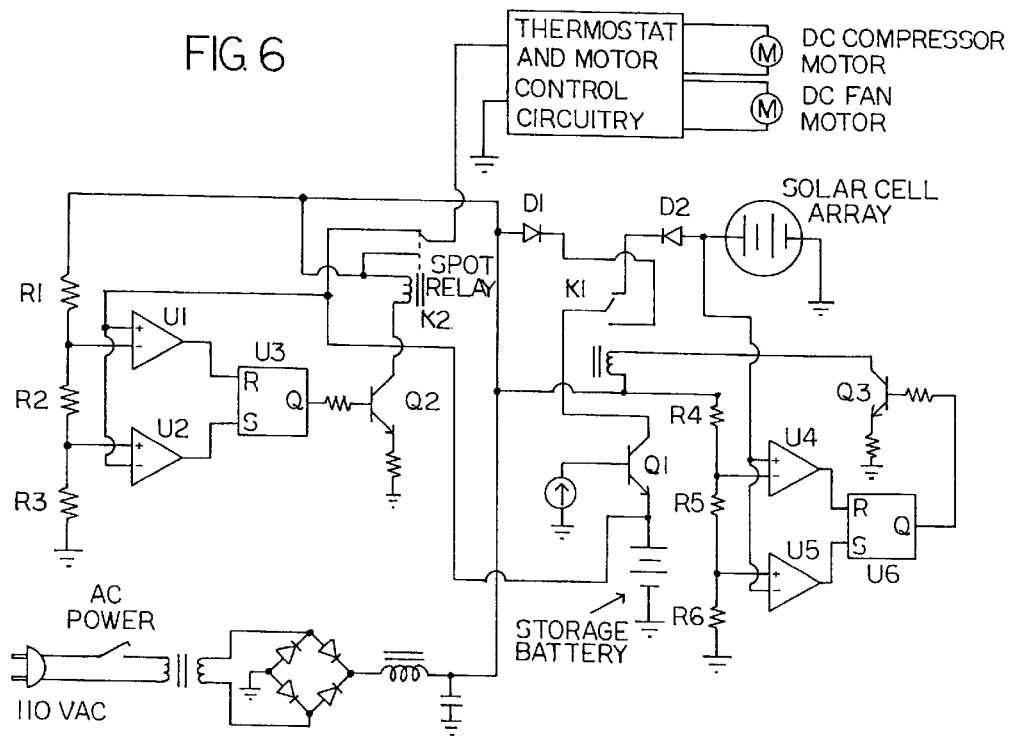
FIG. 6 is a schematic illustration of the present invention.
Figure 7:
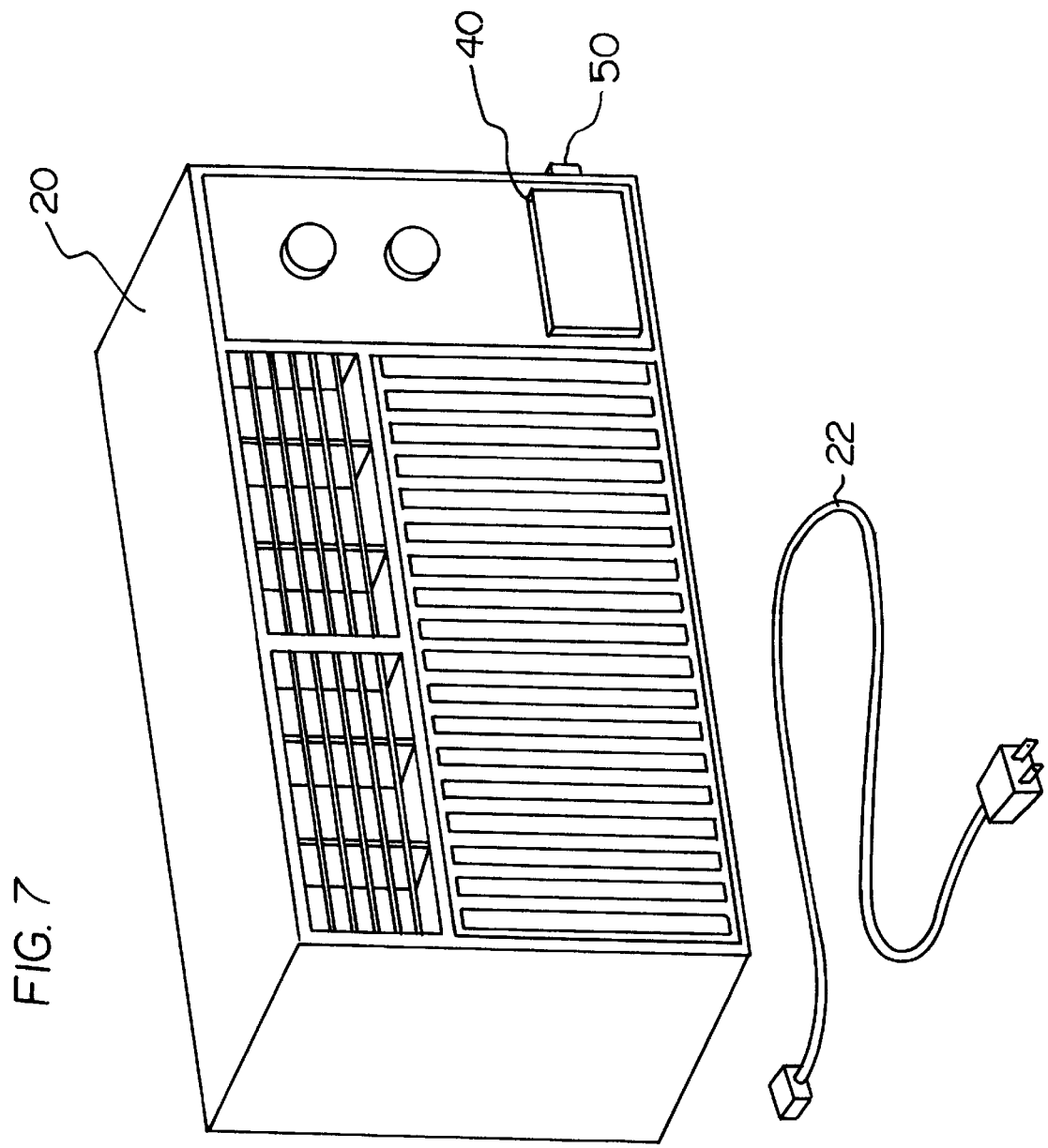
FIG. 7 is a schematic illustration of the present invention which can be designed with or without the solar panel.

As best illustrated in FIGS. 1 through 7, the battery operated air conditioner 10 comprises a conventional air conditioner 20 operating at a high efficiency, and a battery 40 positioned within the conventional air conditioner 20 and electrically connected to the conventional air conditioner 20 for supplying electrical power to the conventional air conditioner 20. FIG. 6 discloses a conventional circuitry well known in the art. The battery 40 is preferably rechargeable for allowing extended life of the battery 40. Preferably, the conventional air conditioner 20 has an access panel 26 that is removably coupled thereto for accessing the battery 40.

Preferably, as shown in FIGS. 1 through 3 of the drawings, a solar panel 30 is mounted to the conventional air conditioner 20 and is electrically connected to the battery 40 by a ribbon cable 34. The ribbon cable 34 allows the solar panel 30 to be pivoted with relation to the conventional air conditioner 20 without damage to the ribbon cable 34. The solar panel 30 is preferably pivotally mounted to an upper rear edge of the conventional air conditioner 20 by a hinge 32 allowing the solar panel 30 to become juxtaposed to an air outlet 24 within the conventional air conditioner 20 when not in operation as shown in FIGS. 1 through 3.

Also preferably, as shown in FIG. 5, the conventional air conditioner 20 includes a power socket 50 for receiving a power cord. The power socket 50 is electrically connected to the battery 40 and the circuitry of the conventional air conditioner 20.

Alternatively or in combination with the solar panel 30, an alternating current power cord 22 is provided to provided alternating current to the conventional air conditioner 20. One end of the alternating current power cord 22 is removably disposed in the power socket 50 of the conventional air conditioner 20. Another end of the alternating current power cord 22 is electrically coupled to a conventional electrical outlet. The alternating current may be used to power the conventional air conditioner 20 when the user desires to not use the battery 40 for the power supply. The alternating current may also be used to recharge the battery 40.

Optionally, a second battery (not shown) may be provided to provide additional power to the conventional air conditioner 20. In such an embodiment, a second power cord 52 is also provided. The second power cord 52 has a pair of opposite ends. One of the ends of the second power cord 52 is electrically coupled to the second battery. Another of the ends of the second power cord is removably disposable in the power socket 50 of the conventional air conditioner 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A battery operated air conditioner, comprising:
    an air conditioner operating at a high efficiency;
    a battery positioned within said air conditioner and electrically connected to said air conditioner for supplying electrical power to said air conditioners and
    a solar panel mounted to said air conditioner and electrically connected to said battery;
    wherein said solar panel is pivotally mounted to an upper rear edge of said air conditioner for allowing said solar panel to become juxtaposed to an air outlet in said air conditioner when not in operation.

2. The battery operated air conditioner of claim 1, wherein said battery is rechargeable.

3. The battery operated air conditioner of claim 2, wherein said air conditioner includes a power socket for receiving a power cord, said power socket being electrically connected to said battery.

4. The battery operated air conditioner of claim 3, further including an alternating current power cord, said alternating current power cord having a pair of opposite ends, one of said ends of said alternating current power cord being electrically coupled to a power outlet, another of said ends of said second power cord being removably disposed in said power socket of said air conditioner.

5. The battery operated air conditioner of claim 3, further comprising a second battery and a second power cord, said second power cord having a pair of opposite ends, one of said ends of said second power cord being electrically coupled to said second battery, another of said ends of said second power cord being removably disposed in said power socket of said air conditioner.

6. The battery operated air conditioner of claim 1, wherein said air conditioner has an access panel being removably coupled thereto, said access panel being for accessing said battery.

7. A battery operated air conditioner, comprising:

a conventional air conditioner operating at a high efficiency;

a battery positioned within said conventional air conditioner and electrically connected to said conventional air conditioner for supplying electrical power to said conventional air conditioner, said battery being rechargeable;

wherein said conventional air conditioner has an access panel removably coupled thereto for accessing said battery;

a solar panel mounted to said conventional air conditioner and electrically connected to said battery by a ribbon cable;

said solar panel being pivotally mounted to an upper rear edge of said conventional air conditioner by a hinge allowing said solar panel to become juxtaposed to an air outlet within said conventional air conditioner when not in operation;

said conventional air conditioner having a power socket for receiving a power cord, said power socket being electrically connected to said battery;

an alternating current power cord being removably disposable in said power socket of said conventional air conditioner, said alternating current power cord being for electrically coupling to a conventional electrical outlet;

a second battery; and a second power cord, said second power cord having a pair of opposite ends, one of said ends of said second power cord being electrically coupled to said second battery, another of said ends of said second power cord being removably disposed in said power socket of said conventional air conditioner.

8. A battery operated air conditioner, comprising:

an air conditioner operating at a high efficiency; and a battery positioned within said conventional air conditioner and electrically connected to said conventional air conditioner for supplying electrical power to said conventional air conditioner;

wherein said battery is rechargeable; and wherein said conventional air conditioner includes a power socket for receiving a power cord, said power socket being electrically connected to said battery.

9. The battery operated air conditioner of claim 8, further including an alternating current power cord, said alternating current power cord having a pair of opposite ends, one of said ends of said alternating current power cord being electrically coupled to a conventional power outlet, another of said ends of said second power cord being removably disposed in said power socket of said conventional air conditioner.

10. The battery operated air conditioner of claim 8, further comprising a second battery and a second power cord, said second power cord having a pair of opposite ends, one of said ends of said second power cord being electrically coupled to said second battery, another of said ends of said second power cord being removably disposed in said power socket of said conventional air conditioner.

11. The battery operated air conditioner of claim 8, wherein said conventional air conditioner has an access panel being removably coupled thereto, said access panel being for accessing said battery.

\* \* \* \* \*